United States Patent
Tüllmann et al.

(10) Patent No.: US 9,481,066 B2
(45) Date of Patent: Nov. 1, 2016

(54) MACHINE TOOL

(75) Inventors: Udo Tüllmann, Eisenach (DE);
Stephan Kümmel, OT Ermsleben (DE)

(73) Assignee: DECKEL MAHO SEEBACH GMBH, Seebach (DE)

( * ) Notice: Subject to any disclaimer, the term of this patent is extended or adjusted under 35 U.S.C. 154(b) by 253 days.

(21) Appl. No.: 14/356,380

(22) PCT Filed: Feb. 3, 2012

(86) PCT No.: PCT/EP2012/000486
§ 371 (c)(1),
(2), (4) Date: May 5, 2014

(87) PCT Pub. No.: WO2013/071984
PCT Pub. Date: May 23, 2013

(65) Prior Publication Data
US 2014/0308087 A1    Oct. 16, 2014

(30) Foreign Application Priority Data
Nov. 18, 2011    (DE) .................... 20 2011 108 058 U

(51) Int. Cl.
*B23Q 11/08* (2006.01)
*B23Q 1/01* (2006.01)
*B23Q 11/00* (2006.01)

(52) U.S. Cl.
CPC .......... *B23Q 11/0825* (2013.01); *B23Q 1/015* (2013.01); *B23Q 1/017* (2013.01); *B23Q 11/0053* (2013.01); *B23Q 11/08* (2013.01); *Y02P 70/171* (2015.11); *Y10T 409/30392* (2015.01); *Y10T 409/304088* (2015.01); *Y10T 409/309576* (2015.01)

(58) Field of Classification Search
CPC .............. B23Q 11/08; B23Q 11/0816; B23Q 11/0825; Y10T 409/30392; Y10T 409/304088
See application file for complete search history.

(56) References Cited

U.S. PATENT DOCUMENTS

| 1,676,311 | A | * | 7/1928 | Zimmermann | .... B23Q 11/0875 29/DIG. 94 |
| 2,149,881 | A | * | 3/1939 | Burrell | ...................... B23Q 1/26 82/149 |
| 2,253,846 | A | * | 8/1941 | Cornell | .................. B23Q 11/08 384/15 |
| 2,788,716 | A | | 4/1957 | McFerren | |
| 4,621,407 | A | * | 11/1986 | Suzuki | .................... B23Q 1/015 29/26 A |
| 4,955,770 | A | | 9/1990 | Kitamura | |
| 7,044,693 | B2 | * | 5/2006 | Fujiwara | ................. B23C 1/002 269/13 |
| 2013/0078046 | A1 | * | 3/2013 | Chuang | .................. B23Q 11/08 409/134 |

FOREIGN PATENT DOCUMENTS

| CH | 225012 | 4/1943 | | |
| EP | 0693345 A1 | 1/1996 | | |
| GB | 2095141 A | * 9/1982 | ............. B23Q 11/08 |

OTHER PUBLICATIONS

International Search Report (PCT/EP2012/000486) 3 pages.

* cited by examiner

*Primary Examiner* — Daniel Howell
(74) *Attorney, Agent, or Firm* — The Maxham Firm

(57) ABSTRACT

A machine tool having a machine frame which has a stand and a machine sub-structure, a workpiece carrier arrangement which can be moved on linear guides, and a machining unit which is arranged on the stand. The machining unit can be moved along at least one coordinate axis and comprises an exchangeable cutting tool. The linear guides and the linear drives of the workpiece carrier arrangement are covered by longitudinally continuous, stationary cover elements and are thus protected against chip deposits.

13 Claims, 4 Drawing Sheets

MACHINE TOOL

FIELD OF INVENTION

The present apparatus relates to a machine tool having a movable workpiece carrier arrangement on linear guides, a machining unit movable in at least one coordinate axis, and having an exchangeable cutting tool, and cover elements arranged over the linear guides to protect against chipfall during machining operations.

BACKGROUND OF THE INVENTION

Relatively small and inexpensive drilling and milling machines are usually made in a cross table design, that is, two of the three main axes are arranged in the machine table. This design results in a horizontally two-dimensional design of the machine bed for receiving the axes. The linear guides aligned along the machine bed in the two coordinate axes and the linear drives thereof must be protected from chipfall and deposits. This is usually done by what is called telescopic covers made of formed sheet segments which can be pushed on top of each other. A drawback of such telescopic covers is the rather large area that, is covered by traveling, which calls far a corresponding enlargement of the machine cabin and the set-up area for the machine. Due to the necessity of arranging the workpiece table at a user-friendly height and due to the necessary stable design of the machine bed, the covers cannot be arranged at an angle of inclination favorable for the chipfall so the chips stay on the covers during the operation. This results in an early wear of the covers, in particular in the bordering area.

In the case of machines having a cross table design, the top side of the machine bed is usually made in a horizontally two-dimensional fashion to receive the table axes or the linear guides, or both. The discharge chutes provided in the bed, which serve for transporting of the chips, can only have a very small gradient of up to 10° on account of the limited workpiece table height and the necessary height of the machine bed. Complex additional devices for cleaning the respective components from the chips and for removing the chips by rinsing or blowing are not always fully effective and increase the technical effort.

SUMMARY OF EMBODIMENTS OF THE INVENTION

It is a purpose of the apparatus to create a machine tool, in particular for milling and drilling, which achieves improved chipfall without the necessity of costly additional devices and which has a set-up area and cabin size that are reduced with respect to machine tools having conventional covers.

According to the embodiments disclosed, the linear guides and drive members of the workpiece carrier arrangement, which can be moved along the machine sub-structure, are covered by longitudinally continuous fixed or stationary cover elements so as to be protected against chipfall.

The chipfall space preferably has a funnel-type shape confined by lateral angular faces, which enables a favorable automatic chipfall into a chip disposal located at the funnel bottom. This makes it possible to reduce the effort for removing the chips and to decrease the number of machine stand-stills for cleaning. According to this concept, the linear guides and the drive members of at least one machine axis are arranged along the machine bed in such a way that the linear guides and the drive members are covered by the cover elements which are attached to the machine bed and are stationary therewith so as to be protected from chipfall and coolant deposits. The cover elements are preferably made as profiled sheets or continuously folded sheet strips and arranged in stationary fashion. With this structure the guide rails and drive members, for example, the spindles of the ball recirculation drives, are covered with adequate intermediate distance and over their entire effective length.

An advantage of this arrangement is that the sheet cover does not extend the area traveled over by the table assembly when moving in the axial direction since the cover elements are stationary and no block dimensions of the covers must be observed. Furthermore, the cover elements can be small and thin-walled since they only prevent the attachment of chips and other solids and otherwise do not have to comply with any supporting function. The inclination of these cover sheets should be chosen to be large enough for chips which might strike to slide downwardly into the chip disposal. Therefore, what is useful in this concept is that the chipfall and the removal of chips can be significantly improved compared with the known cross table machines. This enables shorter non-productive times and longer trouble-free running times. Since conventional complex telescopic covers can be omitted, it is thus possible to reduce the manufacturing costs, to increase the operational reliability, and to also reduce the size of the cabin and of the set-up area for the machine.

In a particularly useful embodiment of the apparatus, only one of the main axes of the machine, that is, the linear guide for the workpiece, is arranged along the machine bed, while the linear guides in the two other main axes are assigned to the machining unit with the work spindle. As a result, complex covers which are moved along and have the above described drawbacks are no longer required since the two spindle-side linear guides are protected by covers which make do without movable parts. In order to avoid the relatively large variable projections of the spindle sleeve in this concept, the linear guide can advantageously be assigned to the machine sub-structure in the main Z-axis.

In another useful embodiment, one of the two linear guides for the workpiece table can be provided on the sub-structure, that is, on both side walls of the sub-structure. This arrangement is a cross table machine concept which is optimized with respect to the chipfall and the set-up area of which is only minimized with respect to the bed axis.

In a useful design of this machine tool, the outer sides of the side walls of the machine bed are aligned in a substantially vertical fashion and at least part of the inner surfaces of these side walls are inclined toward one another in a funnel-shaped fashion. This enables the chips produced during processing to slide over these inclined inner wall sides to the bed bottom, funnels made of plate-like or sheet-like, or both, elements having inclined lateral faces can advantageously be mounted between the side walls of the machine sub-structure, wherein the inner surfaces of the side walls can then extend vertically, in offset fashion or in another way.

In a variant, a linear guide is usefully provided in the Y-coordinate axis along the inner surfaces of each of the side walls, each linear guide being covered by a strip-like protective plate. These protective plates mounted on the side walls should also have an inclination sufficient for the striking chips and liquids to slide down. These protective plates are configured to cover the linear guides fully and over the entire length thereof so as to prevent chips and other substances from depositing on these longitudinal guides. The same applies correspondingly to the linear drives which extend in the longitudinal direction and which are here formed as what is called "ball screw spindles." In the design in question, a ball screw spindle is usefully provided in the central area between the two linear guides below the workpiece table as a drive element, which extends in parallel to the side walls of the bed and is covered by an angular strip-like protective plate.

In a further embodiment of the machine tool, it is advantageous to arrange a first linear guide on the front side of the stand and a second linear guide on a cross-beam which extends between the side walls of the bed, that form a fall funnel, below the workpiece table. The workpiece table may be formed by a ball screw spindle. In this embodiment, the first linear guide and a linear drive for the workpiece table can advantageously be covered by a protective plate strip mounted continuously on the stand. A saddle-like, longitudinally continuous protective plate can be mounted on the flexurally rigid cross-beam for the second linear guide. The cross-beam is rigidly fixed, to the bottom or to the side walls of the bed and the protective plate covers the second lower linear guide.

BRIEF DESCRIPTION OF THE DRAWING

The objects, advantages, and features of the embodiments of the invention will be more clearly perceived from the following detailed description, when read in conjunction with the accompanying drawing, in which.

DETAILED DESCRIPTION OF EMBODIMENTS OF THE INVENTION

Figure 1:
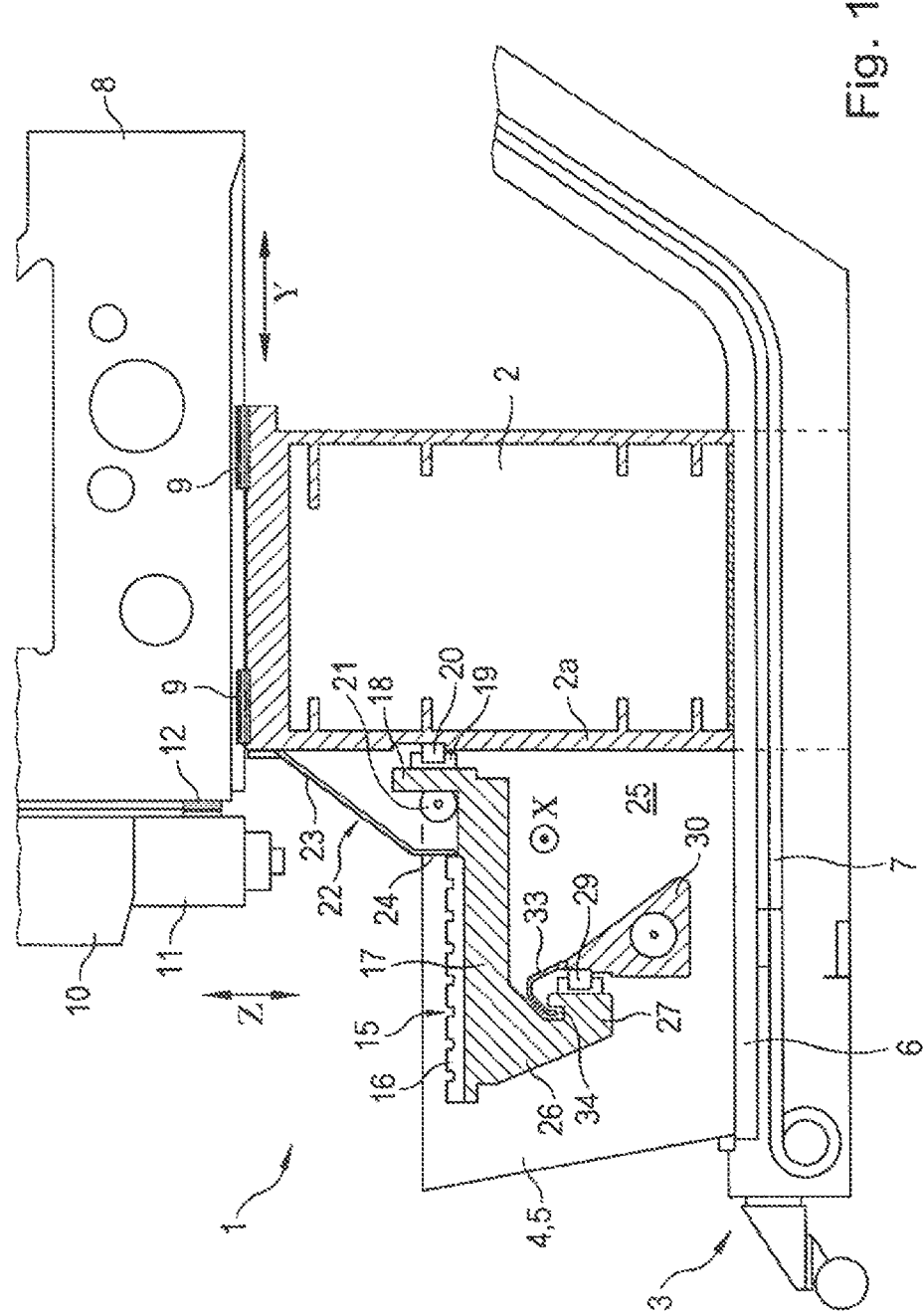
FIG. 1 is a partial longitudinal section of a diagrammatic side view of a first exemplary embodiment of a machine tool according to the invention.

Machine tools of the type shown are milling and drilling machines having three axes of motion. As is evident, machine frame 1 has stationary stand 2 made as a frame structure and bed-like sub-structure 3 which is advantageously designed therewith in what is called a single block design. The structure has side walls 4, 5 and bottom 6 according to FIG. 1. As shown in FIG. 2, the inner surfaces of the side walls are inclined toward each other and form a funnel tapering downwards to the bottom. The angles of inclination of the side walls are chosen in such a way that chips and other material falling thereon slide downwardly. A chip discharge extends above bottom 6. Endless conveyor 7 of the chip discharge departs the tool below the rear side of stand 2.

Figure 2:
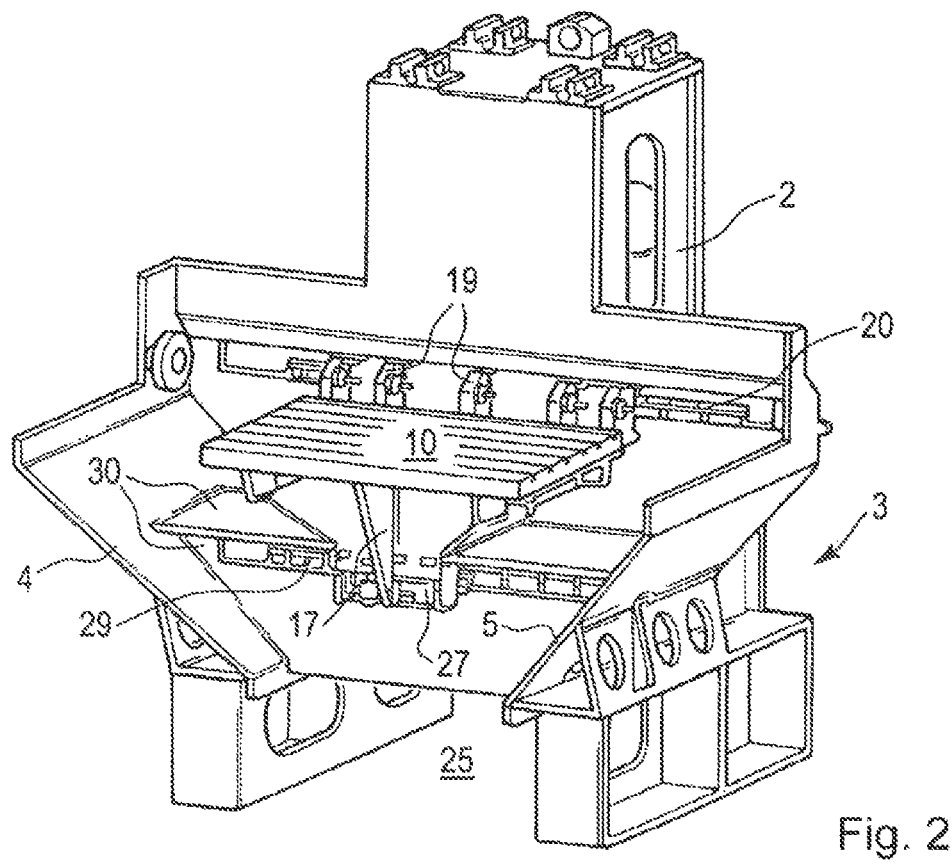
FIG. 2 is a perspective view of the machine tool according to FIG. 1.

As shown in FIG. 1, spindle housing 8 is movably arranged on linear guides 9 by a motor (not shown) in the Y-direction on the top of stand 2. Machining unit 10, which has work spindle 11 and an integrated spindle motor, is mounted in linear guides 12 on the front of spindle housing 8 so as to be moveable by a monitor (not shown) in the direction of the Z-coordinate axis. In work spindle 11, machining tools from a conventional tool magazine (not shown) can automatically be exchanged and replaced by means of a conventional tool changer.

As is also evident from FIG. 1, workpiece carrier 15 is arranged on the front-side of front wall 2a of stand 2 in a free space between the side walls 4, 5. The workpiece carrier has a table configuration with conventional mounting plate 16 for receiving workpieces and support structure 17 winch is here shown as a continuous thick plate for mounting plate 16. Vertical web 18 is mounted on the right end of support structure 17, as shown in FIG. 1. Guide shoes 19 are mounted on web 18. The guide shoes cooperate with continuous guide rail 20 that is attached to the outer surface of front wall 2a of the stand 2 and extends over the effective length of the stand. In the embodiment as shown, lead screw 21 of a linear drive is arranged next to web 18. The linear drive is made in conventional fashion as a ball screw spindle having a drive motor (not shown).

Figure 3:
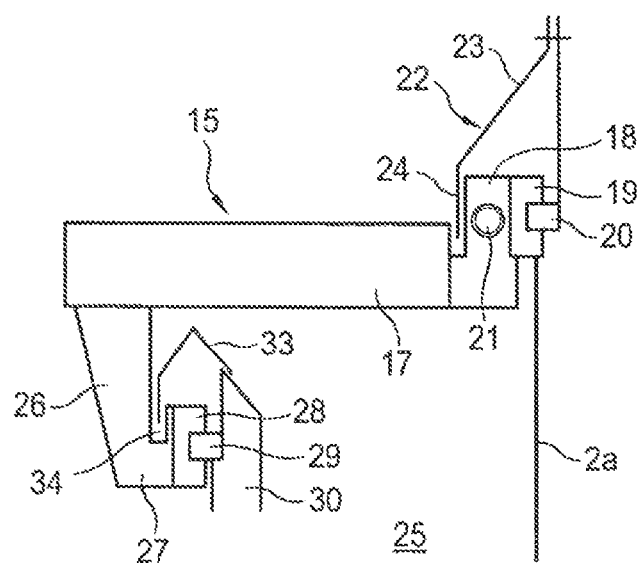
FIG. 3 is a diagrammatical view of the technical concept realized in the exemplary embodiment according to FIG. 1.

Spindle 21 and guide rail 20 are covered over their entire lengths by protective plate 22. The top end of plate 22 is permanently mounted on wall 2a and the plate extends over the effective length of guide rail 20 and ball screw spindle 21. The central part 23 of this strip-like protective plate 22 is inclined at a steep angle and confines the stand-side end of the work chamber. The chips accumulating during machine tool operation slide downwardly over this central part 23 of protective plate 22 and reach chipfall space 25 between side walls 4, 5 of the stand. Lower end region 24 of protective plate 22, in turn, extends vertically and ends directly above the support structure 17. Guide rail 20 and threaded spindle 21 of the ball screw drive are covered over the entire effective length in the X-direction by the above described protective plate 22, as shown in FIGS. 1 and 3. Thus, chips or other solids and rinsing liquids are prevented from being deposited on these components.

In the exemplary embodiment according to FIGS. 1 to 3, support structure 17 of workpiece table 16 has in the front region thereof a downwardly facing shoulder 26 which transitions into rearwardly offset bar 27. Movable shoe 28 and guide rail 29 constitute a linear guide which is mounted on the vertical face of bar 27 which faces stand 2. Guide rail 29 of the linear guide, which extends in the X-coordinate axis, is attached to cross-beam 30, which is triangular in cross-section. In the exemplary embodiment as shown, this cross-beam extends horizontally through the entire chipfall space 25 and is attached at either end to a side wall 4, 5. In order not to disturb the chipfall in the chipfall space, the hypotenuse surface of cross-beam 30 can be sloped at an angle which ensures that the chips slide over this inclined face (see FIGS. 1 and 3). In the embodiment shown, strip-like protective plate 33, which is angled several times, is fixed over die ridge area of cross-beam 30. The end portion of this protective plate, which is angled in the vertical, meshes with a groove 34 at the bar 27 with predetermined clearance and is movable therein. Protective plate 33 is stationary and covers the cross-beam 30 over its entire length and protects guide rail 29 against chip deposits. This effect is achieved by the off-set of shoulder 26 of support structure 17 and by the positioning of linear guide 28, 29 as shown, so as to enable a roof-like cover by protective plate 33.

Figure 4:
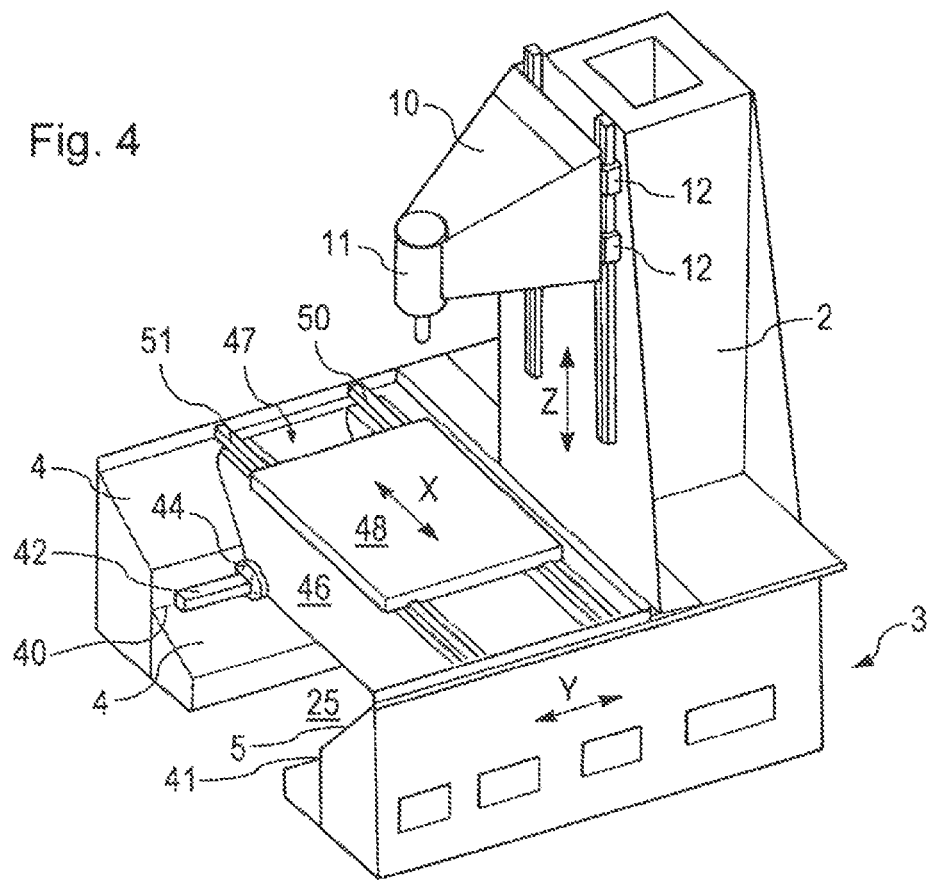
FIG. 4 is a schematic perspective of a second exemplary embodiment of the machine tool according to the invention.
Figure 5:
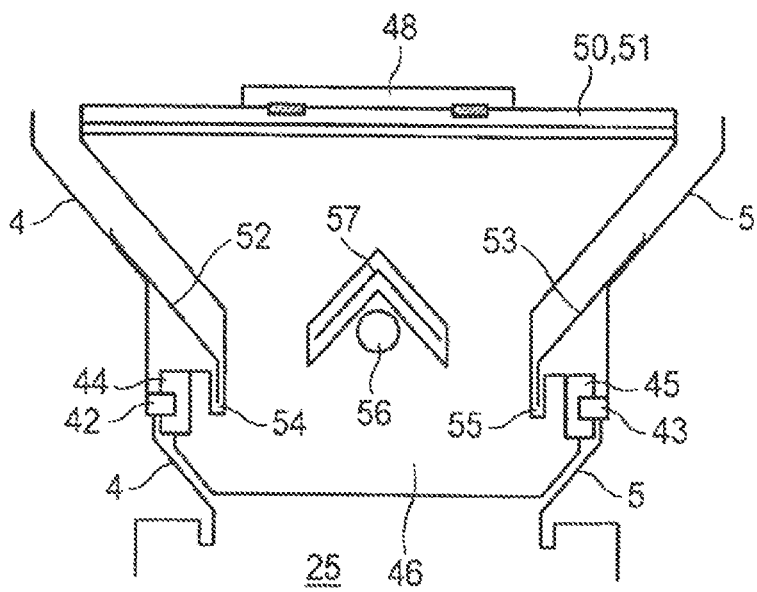
FIG. 5 is a diagrammatical view of the technical concept realized in the exemplary embodiment according to FIG. 4.

The program-controlled milling and drilling machine embodiment shown in FIGS. 4 and 5 also has a vertically aligned machining unit 11, which is mounted on headstock 10 guided in the vertical Z-axis by means of linear guides 12. In this exemplary embodiment, too, side walls 4, 5 of bed 3 are inclined in oblique inward fashion, defining a funnel-shaped chipfall space. In the bottom area of the chipfall space is a chip removal device, not shown in FIGS. 2 and 4. A linear guide is provided in each shoulder 40, 41 of respective side wall 4, 5. Guide rail 42, 43 of the linear guide is mounted on side walls 4, 5. Guide shoes 44, 45 of this linear guide carry panel-shaped wall members 46 of carrier arrangement 47 which supports workpiece table 48. The carrier arrangement is composed of vertical and highly rigid wall members 40 and is movable along guide rails 42, 43 in the direction of the horizontal Y-coordinate axis by means of a linear drive (not shown). Workpiece table 48 of the carrier arrangement is movable in the direction of the horizontal X-coordinate axis on guide rails 50, 51 by means of a linear motor (not shown). As illustrated in FIG. 5, strip-like protective plates 52, 53 are provided in this exemplary embodiment as well, protective plate 52 in the area of side wall 4 and protective plate 53 in the area of the wall 5. These protective plates span the linear guides 42, 43 and mesh with a respective groove 54, 55 in panel component 40 via the vertical end portions thereof. Furthermore, a worm drive 56 is arranged the central area and is covered by an angular protective plate 57 to protect against chip deposits.

Figure 6:
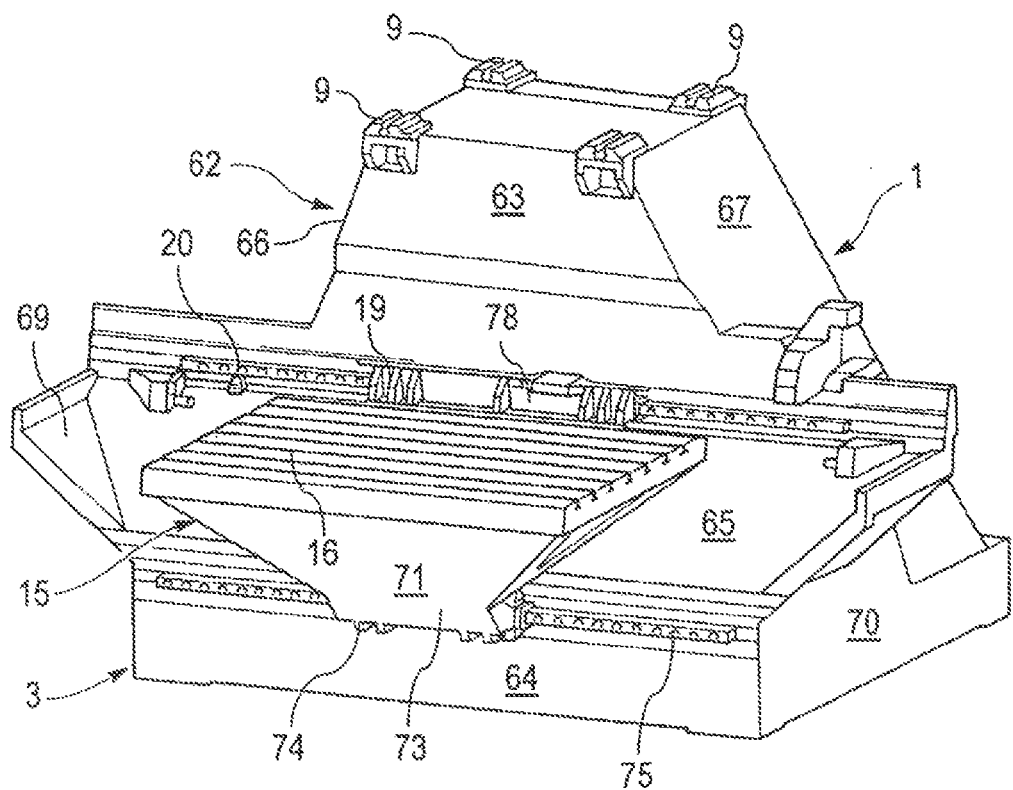
FIG. 6 is a schematic perspective view of a further exemplary embodiment the Invention.
Figure 7:
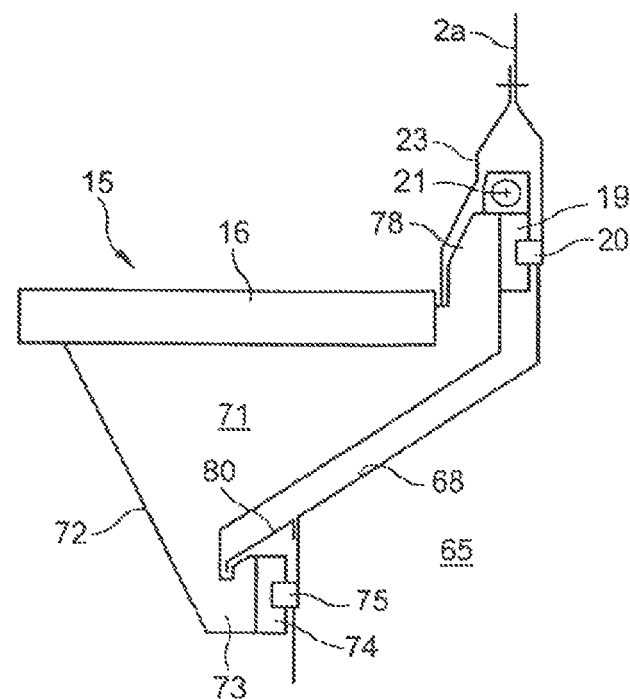
FIG. 7 shows the technical concept realized in the exemplary embodiment according to FIG. 6.

The embodiment shown in FIGS. 6 and 7 largely corresponds to the exemplary embodiment according to FIGS. 1 to 3 as regards its technical concept, wherein equal components are designated by equal reference signs.

According to FIG. 6, machine frame 1 has a stand 62 modified with respect to the embodiment shown in FIGS. 1 to 3. The stand has relatively narrow upper part 63 and relatively wide bed-like sub-structure 64. These two parts of the stand are connected to each other via protruding central part 65 in a single block design. Stand 62 is defined by side faces 66, 67 which are upwardly inclined. Front face 68 of the central part of the stand is also inclined (see FIG. 7), the inclination of which is chosen such a way that depositing chips and other solids slide downwardly. The same applies correspondingly to side walls 69, 70 which laterally confine the sub-structure. These lateral side walls can either be made in integral fashion with the sub-structure or can be installed as separate wall elements. The inner surfaces aside walls 69, 70 define a funnel-shaped chipfall space, the machine-side rear wall of which is defined by inclined face 68 of central part 65.

In the embodiment according to FIG. 6, which is similar to the embodiment according to FIG. 1, workpiece carrier 15 is arranged on the front wall of stand 62 in the free space between inclined side walls 69, 70. Here the design of the workpiece table carrier largely corresponds to that of table carrier 15 in FIG. 1. This applies in particular to the support bearing of the workpiece canter structure, which is shown in the right-hand top of FIGS. 3 and 7. Reference is made to the corresponding statements regarding FIG. 3.

The embodiment according to FIGS. 6 and 7 differs from the embodiment of FIGS. 1 to 3 not only by the different form of the machine stand but also by a different support of mounting plate 16 of workpiece carrier 15 on the machine stand. Mounting plate 16 is supported by panel 71 which has front inclined face 72 and shoulder 73 offset toward the stand side at the lower end region thereof. Guide shoes 74 are mounted on the vertical front face of shoulder 73 and run in a stand-fixed guide rail 75. As is evident from FIG. 6, the guide arrangement of panel 71 is considerably narrower titan the upper port of panel. The upper guide arrangement has, at the right-hand end of mounting plate 16, an upwardly protruding web 78, on the right-hand vertical side of which guide shoes 19 are mounted.

The embodiment of FIGS. 6 and 7 has the same advantages as the embodiment according to FIGS. 1 to 3 as regards the set-up area and the chipfall. However, a special rigidity and favorable oscillating properties are more advantageous, which is achieved, inter alia, by the supporting bearing and the support of the table design directly on the front side of the machine stand. This also leads to a particularly favorable collecting space for the chips, cooling lubricant and other particles due to the rear wall of the chipfall space, which is adequately inclined to the front and which is thus not only confined by lateral inclined faces 69, 70 but also by rear inclined face 68.

The apparatus here described not limited to the exemplary embodiments presented and described above. For example, it is not absolutely necessary for the chipfall funnel to be directly confined by the inner surfaces of the two side walls of the machine bed. It is also possible instead to use inclined sheet or plate elements which might also be installed subsequently, if necessary.

What is claimed is:

1. A program controlled machine tool for the machining of workpieces, the machine tool comprising:
   a machine frame having a machine sub-structure including two spaced side walls, and a stand having a front wall;
   horizontal linear guides on said machine frame;
   a workpiece carrier movably mounted on said horizontal linear guides;
   a machining unit having an exchangeable cutting tool, said machining unit being movably arranged along at least one coordinate axis on said stand;
   a linear drive coupled to said workpiece carrier so as to move said workpiece carrier along said horizontal linear guides;
   cover elements arranged over said linear guides to protect against chip deposits resulting from machining operations of the machine tool, said cover elements being configured as longitudinally continuous profiled sheet strips, a said cover element being connected to a front side wall of said stand and extending as a protective plate over a first said linear guide and said linear drive; and
   a cross-beam arranged between said side walls, a second linear guide being attached to said cross-beam, said second linear guide supporting said workpiece carrier, said second linear guide being covered by a profiled sheet strip attached to said cross-beam.

2. The machine tool according to claim 1, wherein the profiled sheet strip covering said first linear guide is continuously mounted on said front wall of said stand via an upper end portion thereof.

3. The machine tool according to claim 1, wherein the profiled sheet strip covering said first linear guide has a central part which is inclined at a steep angle toward the vertical and covers said first linear guide over the entire effective length thereof and angles from said inclined part to a vertical lower end portion which ends directly above said workpiece carrier.

4. The machine tool according to claim 2, wherein the profiled sheet strip covering said first linear guide has a central part which is inclined at a steep angle toward the vertical and covers said first linear guide over the entire effective length thereof and angles from said inclined part to a vertical lower end portion which ends directly above said workpiece carrier.

5. The machine tool according claim 1, wherein the space between said two spaced side walls of said machine sub-structure is defined by sliding surfaces which are arranged so as to be inclined toward each other and which form a chipfall funnel.

6. The machine tool according to claim 1, wherein said stand has a central part formed with an inclined face, a lower linear guide is arranged below said inclined face and is covered by a continuous profiled sheet strip, wherein said central part of said stand forms said cross-beam.

7. A program controlled machine tool for the machining of workpieces, the machine tool comprising:
   a machine frame having a machine sub-structure including two spaced side walls, and a stand having a front wall;
   horizontal linear guides on said machine frame;
   a workpiece carrier movably mounted on said horizontal linear guides;
   a machining unit having an exchangeable cutting tool, said machining unit being movably arranged along at least one coordinate axis on said stand;
   a linear drive coupled to said workpiece carrier so as to move said workpiece carrier along said horizontal linear guides;
   cover elements arranged over said linear guides to protect against chip deposits resulting from machining operations of the machine tool, said cover elements being configured as longitudinally continuous profiled sheet strips said profiled sheet strips each having an upper edge and are only attached to said machine via said upper edge thereof;
   one said linear guide is provided on each side wall of said machine sub-structure; and
   a said cover element attached to each said side wall and arranged to cover each said linear guide on said side walls.

8. The machine tool according to claim 7, wherein a said linear guide extends in a second coordinate direction perpendicular to said one coordinate axis and is arranged on each said side wall, and one drive unit is positioned below said workpiece carrier, each said linear guide being protected against chip deposits by a said profiled sheet strip.

9. The machine tool according claim 7, said workpiece carrier further comprising spaced vertical wall elements acting as support structures for two parallel guide rails on said vertical wall elements, and a workpiece mounting table mounted on said parallel guide rails so as to be movable in the direction of a coordinate axis perpendicular to said one coordinate axis.

10. The machine tool according to claim 7, wherein said stand and said sub-structure of said machine frame are made as an integral single block.

11. A program controlled machine tool for the machining of workpieces, the machine tool comprising:
   a machine frame having a machine sub-structure including two spaced side walls, and a stand having a front wall, said stand having the shape of a tetrahedron having a narrow upper part, a central part containing a front-side inclined face, and a wider sub-structure which incorporates two side walls which are inclined downwardly toward each other, said stand being defined on both sides by inclined side faces between said narrow upper part and said wider sub-structure;
   horizontal linear guides on said machine frame;
   a workpiece carrier movably mounted on said horizontal linear guides;
   a machining unit having an exchangeable cutting tool, said machining unit being movably arranged along at least one coordinate axis on said stand;
   a linear drive coupled to said workpiece carrier so as to move said workpiece carrier along said horizontal linear guides;
   cover elements arranged over said linear guides to protect against chip deposits resulting from machining operations of the machine tool, said cover elements being configured as longitudinally continuous profiled sheet strips;
   one said linear guide is provided on each side wall of said machine sub-structure; and
   a said cover element attached to each said side wall and arranged to cover each said linear guide on said side walls.

12. A program controlled machine tool for the machining of workpieces, the machine tool comprising:
   a machine frame having a machine sub-structure including two spaced side walls, and a stand having a front wall;
   horizontal linear guides on said machine frame;
   a workpiece carrier movably mounted on said horizontal linear guides, said workpiece carrier comprising spaced vertical wall elements acting as support structures for two parallel guide rails on said vertical wall elements, and a workpiece mounting table mounted on said parallel guide rails so as to be movable in the direction of a coordinate axis perpendicular to said one coordinate axis;
   a machining unit having an exchangeable cutting tool, said machining unit being movably arranged along at least one coordinate axis on said stand;
   a linear drive coupled to said workpiece carrier so as to move said machining unit along said horizontal linear guides;
   cover elements arranged over said linear guides to protect against chip deposits resulting from workpiece carrier of the machine tool, said cover elements being configured as longitudinally continuous profiled sheet strips;
   one said linear guide is provided on each side wall of said machine sub-structure; and
   a said cover element attached to each said side wall and arranged to cover each said linear guide on said side walls.

13. The machine tool according claim 8, said workpiece carrier further comprising spaced vertical wall elements acting as support structures for two parallel guide rails on said vertical wall elements, and a workpiece mounting table mounted on said parallel guide rails so as to be movable in the direction of a third coordinate axis perpendicular to said one coordinate axis and said second coordinate direction.

* * * * *